(12) United States Patent
Manolakos et al.

(10) Patent No.: US 11,743,085 B2
(45) Date of Patent: Aug. 29, 2023

(54) CYCLIC PREFIX ORTHOGONAL FREQUENCY DIVISION MULTIPLEXING SEQUENCE CONFIGURATION OF A DOWNLINK/UPLINK

(71) Applicant: QUALCOMM Incorporated, San Diego, CA (US)

(72) Inventors: Alexandros Manolakos, Escondido, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/691,996

(22) Filed: Mar. 10, 2022

(65) Prior Publication Data

US 2022/0201687 A1 Jun. 23, 2022

Related U.S. Application Data

(63) Continuation of application No. 16/670,932, filed on Oct. 31, 2019, now Pat. No. 11,297,621.

(30) Foreign Application Priority Data

Nov. 2, 2018 (GR) ............................... 20180100503

(51) Int. Cl.
*H04L 5/00* (2006.01)
*H04L 5/10* (2006.01)
(Continued)

(52) U.S. Cl.
CPC ........ *H04L 27/2613* (2013.01); *H04L 5/0051* (2013.01); *H04L 5/10* (2013.01);
(Continued)

(58) Field of Classification Search
CPC ............. H04L 27/2613; H04L 27/2603; H04L 5/0051; H04W 76/27; H04W 72/042; H04W 72/0466; H04W 80/02
(Continued)

(56) References Cited

U.S. PATENT DOCUMENTS

2018/0278395 A1* 9/2018 Yoon ..................... H04L 5/0048
2020/0146016 A1 5/2020 Manolakos et al.
(Continued)

FOREIGN PATENT DOCUMENTS

| EP | 2648448 B1 | 6/2020 |
| WO | 2016127309 A1 | 8/2016 |
| WO | WO-2016127309 A1 * | 8/2016 |

OTHER PUBLICATIONS

R1-1811542 (Year: 2018).*

(Continued)

*Primary Examiner* — Intekhaab A Siddiquee
(74) *Attorney, Agent, or Firm* — MG-IP Law, P.C.

(57) ABSTRACT

In an aspect, a network entity may receive download control information (DCI) indicating a first scrambling identification value, a second scrambling identification value, and a scrambling selection value, wherein the scrambling selection value has either a first scrambling selection value or a second scrambling selection value. The network entity may configure a first demodulation reference signal (DMRS) symbol sequence based on a first initial seed value, a second DMRS symbol sequence based on a second initial seed value, and a third DMRS symbol sequence based on a third initial seed value. The network entity may be configured, based on the scrambling selection value, to transmit or receive DMRS on a group of code division multiplexed
(Continued)

620 →

| | DMRS antenna ports | | | |
|---|---|---|---|---|
| | 0 | 1 | 2 | 3 |
| 11 | 0 | 0 | $r(5)$ | $-r(5)$ |
| 10 | $r(5)$ | $-r(5)$ | 0 | 0 |
| 9 | 0 | 0 | $r(4)$ | $r(4)$ |
| 8 | $r(4)$ | $r(4)$ | 0 | 0 |
| 7 | 0 | 0 | $r(3)$ | $-r(3)$ |
| 6 | $r(3)$ | $-r(3)$ | 0 | 0 |
| 5 | 0 | 0 | $r(2)$ | $r(2)$ |
| 4 | $r(2)$ | $r(2)$ | 0 | 0 |
| 3 | 0 | 0 | $r(1)$ | $-r(1)$ |
| 2 | $r(1)$ | $-r(1)$ | 0 | 0 |
| 1 | 0 | 0 | $r(0)$ | $r(0)$ |
| 0 | $r(0)$ | $r(0)$ | 0 | 0 |

Subcarrier (rows 0–11)

FD-OCC(2) 2 ports per CDM group | CDM group 0 (Comb 0) | CDM group 1 (Comb 1)

(CDM) antenna ports based on either the first DMRS symbol sequence, the second DMRS symbol sequence, or the third DMRS symbol sequence.

8 Claims, 15 Drawing Sheets

(51) Int. Cl.
  *H04W 72/044* (2023.01)
  *H04W 72/23* (2023.01)
  *H04W 76/27* (2018.01)
  *H04W 80/02* (2009.01)
  *H04L 27/26* (2006.01)

(52) U.S. Cl.
  CPC ..... *H04L 27/2603* (2021.01); *H04W 72/0466* (2013.01); *H04W 72/23* (2023.01); *H04W 76/27* (2018.02); *H04W 80/02* (2013.01)

(58) Field of Classification Search
  USPC .......................................................... 370/329
  See application file for complete search history.

(56) References Cited

U.S. PATENT DOCUMENTS

2021/0306191 A1* 9/2021 Lin ..................... H04L 1/0071
2021/0328734 A1* 10/2021 Noh ..................... H04L 5/005

OTHER PUBLICATIONS

R1-1811543 (Year: 2018).*
Ericsson: "Benefits of Resource Specific DMRS Mapping", 3GPP TSG RAN WG1 Meeting #93, 3GPP Draft; R1-1806231 Benefits of Resource Specific DMRS Mapping, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 20, 2018 (May 20, 2018), 3 Pages, XP051441440, Retrieved from the Internet: URL: http://www.3gpp.org/ftp/Meetings%5F3GPP%5FSYNC/RAN1/Docs/ [retrieved on May 20, 2018] Section 1.; figures 1,3.
Ericsson: "Conclusion on the Need for CSI-RS and DMRS PAPR Reduction", 3GPP TSG RAN WG1 Meeting #94bis,R1-1811184, Chengdu, China, Oct. 8-12, 2018, pp. 1-14.
Ericsson: "On Specification-based Solutions to the CSI-RS PAPR Issue", 3GPP TSG RAN WG1 Meeting #94-bis, 3GPP Draft; R1-1811543 On Specification-based Solutions to the CSI-RS PAPR Issue, 3rd Generation Partnership Project (3GPP), Mobile Competence Centre; 650, Route Des Lucioles; F-06921 Sophia-Antipolis, vol. RAN WG1, No. Chengdu, China; Oct. 8, 2018-Oct. 12, 2018, Sep. 29, 2018 (Sep. 29, 2018), pp. 1-4, XP051518943.
Ericsson: "On Specification-based Solutions to the DMRS PAPR Issue", 3GPP TSG RAN WG1 Meeting #94-bis, 3GPP Draft; R1-1811542 On Specification-based Solutions to the DMRS PAPR Issue, 3rd Generation Partnership Project (3GPP), Mobile Competence Centre; 650, Route Des Lucioles; F-06921 Sophia-Antipolis, vol. RAN WG1, No. Chengdu, China; Oct. 8, 2018-Oct. 12, 2018, Sep. 29, 2018 (Sep. 29, 2018), pp. 1-5, XP051518942.
International Preliminary Report on Patentability—PCT/US2019/059434, the International Bureau of WIPO—Geneva, Switzerland, dated May 14, 2021.
International Search Report and Written Opinion—PCT/US2019/059434—ISA/EPO—dated Feb. 20, 2020.
Qualcomm Inc.: "Lower PAPR Reference Signals", 3GPP TSG RAN WG1 Meeting #95, 3GPP Draft; R1-1813445 Lower PAPR Reference Signals, 3rd Generation Partnership Project (3GPP), Mobile Competence Centre, 650, Route Des Lucioles, F-06921 Sophia-Antipolis Cedex, FR, vol. RAN WG1, No. Spokane, WA, USA, Nov. 12, 2018-Nov. 16, 2018, Nov. 3, 2018 (Nov. 3, 2018), pp. 1-24, XP051479767, Retrieved from Internet: URL: http://www.3gpp.org/ftp/tsg%5Fran/WG1%5FRL1/TSGR1%5F95/Docs/R1%2D1813445%2Ezip [retrieved Nov. 3, 2018] Section 4, Section 3, tables 6-8.
Taiwan Search Report—108139698—TIPO—dated Dec. 16, 2022.

* cited by examiner

| | | DMRS antenna ports | | | |
|---|---|---|---|---|---|
| | | 0 | 1 | 2 | 3 |
| Subcarrier | 11 | 0 | 0 | $r(5)$ | $-r(5)$ |
| | 10 | $r(5)$ | $-r(5)$ | 0 | 0 |
| | 9 | 0 | 0 | $r(4)$ | $r(4)$ |
| | 8 | $r(4)$ | $r(4)$ | 0 | 0 |
| | 7 | 0 | 0 | $r(3)$ | $-r(3)$ |
| | 6 | $r(3)$ | $-r(3)$ | 0 | 0 |
| | 5 | 0 | 0 | $r(2)$ | $r(2)$ |
| | 4 | $r(2)$ | $r(2)$ | 0 | 0 |
| | 3 | 0 | 0 | $r(1)$ | $-r(1)$ |
| | 2 | $r(1)$ | $-r(1)$ | 0 | 0 |
| | 1 | 0 | 0 | $r(0)$ | $r(0)$ |
| | 0 | $r(0)$ | $r(0)$ | 0 | 0 |
| | FD-OCC(2) 2 ports per CDM group | CDM group 0 (Comb 0) | | CDM group 1 (Comb 1) | |

| CDM group ID | Option 1 (n_SCID=0) | Option 2 (n_SCID=1) |
|---|---|---|
| 0 | 0 | 1 |
| 1 | 0 | 1 |

720 ↓ (Option 1 column), 730 ↓ (Option 2 column), 740 (row 0), 750 (row 1)

| CDM group ID | Option 1 (n_SCID=0) | Option 2 (n_SCID=1) |
|---|---|---|
| 0 | 0 | 1 |
| 1 | 0 | 1 |
| 2 | 0 | 1 |

720 ↓, 730 ↓, 740 (row 0), 750 (row 1), 790 (row 2)

FIG. 7B

|       | CDM group ID | Option 1 | Option 2 | Option 3 | Option 4 |
|-------|--------------|----------|----------|----------|----------|
| 740 → | 0            | 0        | 1        | 0        | 1        |
| 750 → | 1            | 0        | 1        | 1        | 0        |

| Value | Two Codewords: Codeword 0 enabled, Codeword 1 enabled | | |
|---|---|---|---|
| | Number of DMRS CDM group(s) without data | DMRS port(s) | Number of front-load symbols |
| 0 | 3 | 0-4 | 1 |
| 1 | 3 | 0-5 | 1 |
| 2 | 2 | 0,1,2,3,6 | 2 |
| 3 | 2 | 0,1,2,3,6,8 | 2 |
| 4 | 2 | 0,1,2,3,6,7,8 | 2 |
| 5 | 2 | 0,1,2,3,6,7,8,9 | 2 |
| 6-63 | Reserved | Reserved | Reserved |

CYCLIC PREFIX ORTHOGONAL FREQUENCY DIVISION MULTIPLEXING SEQUENCE CONFIGURATION OF A DOWNLINK/UPLINK

CROSS-REFERENCE TO RELATED APPLICATION

The present Application for Patent is a Continuation of and claims priority under 35 U.S.C. § 120 to U.S. patent application Ser. No. 16/670,932, filed Oct. 31, 2019, entitled "CYCLIC PREFIX ORTHOGONAL FREQUENCY DIVISION MULTIPLEXING SEQUENCE CONFIGURATION OF A DOWNLINK/UPLINK," and under 35 U.S.C. § 119 to Greek Patent Application No. 20180100503, also entitled "CYCLIC PREFIX ORTHOGONAL FREQUENCY DIVISION MULTIPLEXING SEQUENCE CONFIGURATION OF A DOWNLINK/UPLINK," filed Nov. 2, 2018, both of which are assigned to the assignee hereof, and are expressly incorporated herein by reference in their entireties.

FIELD OF DISCLOSURE

This disclosure relates generally to wireless communication systems, and more specifically, but not exclusively, to low peak average power ratio (PAPR) cyclic prefix (CP) orthogonal frequency division multiplexing (OFDM) sequence configuration for a downlink (DL)/uplink (UL).

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

For example, with physical downlink shared channel (PDSCH) demodulation reference signal (DMRS) and physical uplink shared channel (PUSCH) DMRS for CP-OFDM, DMRS enhancements are specified in release 16 of the 5G standard to reduce the PAPR to the same level as for data symbols for all port combinations given by 3GPP technical specification 38.212 of the 5G standard. For the Rel-16 DMRS enhancement, each code division multiplexing (CDM) group can be configured with a different sequence initialization value (cinit):

$$c_{init} = \\ (2^{17}(N_{symb}^{slot}n_{s,f}^{\mu} + l + 1)(2N_{ID}^{n_{SCID}} + 1) + 2N_{ID}^{n_{SCID}} + n_{SCID}) \\ \mod 2^{31} \quad \text{EQUATION 1}$$

Where Cinit is a scrambling sequence initialization, $N_{ID}$ is a scrambling identification, and $n_{SCID}$ is a scrambling selection value used for offsetting a sequence and to select a scrambling identification.

For Type 1 configurations, the two cinit (configured by $n_{SCID}$=0, 1, respectively) in release 15 of the 5G standard are used for port(s) in each of the two CDM groups, respectively. For Type 2 configurations, release 16 introduces the CDM group index in cinit. However, the current version of release 16 does not describe or specify how the CDM group index is derived.

For Type 1 and Type 2, the current version of release 16 simultaneously uses dynamic transmission point (TRP) selection (or multi-user, multi-input multi-output (MU-MIMO) pairing with different nscids) and a CDM group specific cinit is supported. While the current version of release 16 specifically precludes modification of the orthogonal cover code (OCC), modification of the pseudo-noise (PN) sequence generation (such as subsampling a longer sequence) but requires maintaining backward compatibility issues and the total number of cinit configured per UE. However, the current version of release 16 does not describe or specify how this is achieved.

Accordingly, there is a need for systems, apparatus, and methods that overcome the deficiencies of conventional approaches, such as how the CDM group index is derived and how to simultaneously use dynamic TRP selection with a CDM group specific cinit, including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In an aspect, a method of wireless communication performed by a network entity includes receiving download control information (DCI) indicating a first scrambling identification value, a second scrambling identification value, and a scrambling selection value, wherein the scrambling selection value has either a first scrambling selection value or a second scrambling selection value; configuring a first demodulation reference signal (DMRS) symbol sequence based on receiving the first scrambling selection value, wherein the first DMRS symbol sequence is based on a first initial seed value, wherein the first initial seed value is based on the first scrambling selection value and the first scrambling identification value; configuring a second DMRS symbol sequence based on receiving the second scrambling selection value, wherein the second DMRS symbol sequence is based on a second initial seed value, wherein the second initial seed value is based on the second scrambling selection value and the second scrambling identification value; configuring a third DMRS symbol sequence based on a third initial seed value, wherein the third initial seed value is based on the scrambling selection value and a modified selected scrambling identification value, wherein the modified selected scrambling identification value is determined based on the first scrambling identification value or the second scrambling identification value but not equal to either the first scrambling identification value or the second scrambling identification value; and configuring the network entity, based on the scrambling selection value, to transmit or receive DMRS on a group of code division multiplexed (CDM) antenna ports based on either the first DMRS symbol sequence, the second DMRS symbol sequence, or the third DMRS symbol sequence.

In another aspect, a method of operating an user equipment (UE) includes: configuring an UE to transmit or receive on a first port of a plurality of demodulation reference signals (DMRS) ports associated with a first code division multiplexing identification (CDM ID) and on a second port of the plurality of DMRS ports associated with a second CDM ID; selecting a first collection of port sequences and a second collection of port sequences from a plurality of sequence options, each of the first collection of port sequences and the second collection of port sequences comprising a first CDM ID sequence identification (ID) and a second CDM ID sequence ID, wherein each of the first CDM ID sequence identification (ID) and the second CDM ID sequence ID is one of a first value or a second value; configuring a first port scrambling sequence of the first port and a second port scrambling sequence of the second port for each of the first collection of port sequences and the second collection of port sequences; performing a dynamic selection of a first port option selection for the first port between the first port scrambling sequence of first port based on the first collection of port sequences and the first port scrambling sequence of the first port based on the second collection of port sequences based on information carried on a downlink control information (DCI) channel; performing a dynamic selection of a second port option selection for the second port between the second port scrambling sequence of second port based on the first collection of port sequences and the second port scrambling sequence of the second port based on the second collection of port sequences based on information carried on the DCI channel; and transmitting or receiving a DMRS based on the first port option selection and the second port option selection.

In another aspect, a non-transitory computer-readable medium comprising instructions that when executed by a processor cause the processor to perform a method includes: configuring an UE to transmit or receive on a first port of a plurality of demodulation reference signals (DMRS) ports associated with a first code division multiplexing identification (CDM ID) and on a second port of the plurality of DMRS ports associated with a second CDM ID; selecting a first collection of port sequences and a second collection of port sequences from a plurality of sequence options, each of the first collection of port sequences and the second collection of port sequences comprising a first CDM ID sequence identification (ID) and a second CDM ID sequence ID, wherein each of the first CDM ID sequence identification (ID) and the second CDM ID sequence ID is one of a first value or a second value; configuring a first port scrambling sequence of the first port and a second port scrambling sequence of the second port for each of the first collection of port sequences and the second collection of port sequences; performing a dynamic selection of a first port option selection for the first port between the first port scrambling sequence of first port based on the first collection of port sequences and the first port scrambling sequence of the first port based on the second collection of port sequences based on information carried on a downlink control information (DCI) channel; performing a dynamic selection of a second port option selection for the second port between the second port scrambling sequence of second port based on the first collection of port sequences and the second port scrambling sequence of the second port based on the second collection of port sequences based on information carried on the DCI channel; and transmitting or receiving a DMRS based on the first port option selection and the second port option selection.

In still another aspect, an apparatus for receiving and transmitting radio frequency (RF) signals includes: a memory; a processor coupled to the memory; a plurality of antenna ports coupled to the processor; wherein the processor is configured to: configure an UE to transmit or receive on a first port of a plurality of demodulation reference signals (DMRS) ports associated with a first code division multiplexing identification (CDM ID) and on a second port of the plurality of DMRS ports associated with a second CDM ID; select a first collection of port sequences and a second collection of port sequences from a plurality of sequence options, each of the first collection of port sequences and the second collection of port sequences comprising a first CDM ID sequence identification (ID) and a second CDM ID sequence ID, wherein each of the first CDM ID sequence identification (ID) and the second CDM ID sequence ID is one of a first value or a second value; configuring a first port scrambling sequence of the first port and a second port scrambling sequence of the second port for each of the first collection of port sequences and the second collection of port sequences; perform a dynamic selection of a first port option selection for the first port between the first port scrambling sequence of first port based on the first collection of port sequences and the first port scrambling sequence of the first port based on the second collection of port sequences based on information carried on a downlink control information (DCI) channel; perform a dynamic selection of a second port option selection for the second port between the second port scrambling sequence of second port based on the first collection of port sequences and the second port scrambling sequence of the second port based on the second collection of port sequences based on information carried on the DCI channel; and transmit or receiving a DMRS based on the first port option selection and the second port option selection.

In still another aspect, an apparatus for receiving and transmitting radio frequency (RF) signals includes: means for storing information; means for processing information, the means for processing information coupled to the means for storing information; means for transmitting and receiving RF signals, the means for transmitting and receiving RF signals coupled to the means for processing information; wherein the means for processing information is configured to: configure an UE to transmit or receive on a first port of a plurality of demodulation reference signals (DMRS) ports associated with a first code division multiplexing identification (CDM ID) and on a second port of the plurality of DMRS ports associated with a second CDM ID; select a first collection of port sequences and a second collection of port sequences from a plurality of sequence options, each of the first collection of port sequences and the second collection of port sequences comprising a first CDM ID sequence identification (ID) and a second CDM ID sequence ID, wherein each of the first CDM ID sequence identification (ID) and the second CDM ID sequence ID is one of a first value or a second value; configuring a first port scrambling sequence of the first port and a second port scrambling sequence of the second port for each of the first collection of port sequences and the second collection of port sequences; perform a dynamic selection of a first port option selection for the first port between the first port scrambling sequence of first port based on the first collection of port sequences and the first port scrambling sequence of the first port based on the second collection of port sequences based on information carried on a downlink control information (DCI) channel; perform a dynamic selection of a second port option selection for the second port between the second port scrambling sequence of second port based on the first collection of port sequences and the second port scrambling sequence of the second port based on the second collection of port sequences based on information carried on the DCI channel; and transmit or receiving a DMRS based on the first port option selection and the second port option selection.

In still another aspect, a method of operating an user equipment (UE) includes: configuring an UE to transmit or receive on a first port of a plurality of demodulation reference signals (DMRS) ports associated with a first code division multiplexing identification (CDM ID), on a second port of the plurality of DMRS ports associated with a second CDM ID, and on a third port of the plurality of DMRS ports associated with a third CDM ID; selecting a first collection of port sequences and a second collection of port sequences from a plurality of sequence options, each of the first collection of port sequences and the second collection of port sequences comprising a first CDM ID sequence identification (ID), a second CDM ID sequence ID, and a third CDM ID sequence ID, wherein each of the first CDM ID sequence identification (ID), the second CDM ID sequence ID, and the third CDM ID sequence ID is one of a first value or a second value; configuring a first port scrambling sequence of the first port, a second port scrambling sequence of the second port, and a third port scrambling sequence of the third port for each of the first collection of port sequences and the second collection of port sequences; performing a dynamic selection of a first port option selection for the first port between the first port scrambling sequence of first port based on the first collection of port sequences and the first port scrambling sequence of the first port based on the second collection of port sequences based on information carried on a downlink control information (DCI) channel; performing a dynamic selection of a second port option selection for the second port between the second port scrambling sequence of second port based on the first collection of port sequences and the second port scrambling sequence of the second port based on the second collection of port sequences based on information carried on the DCI channel; performing a dynamic selection of a third port option selection for the third port between the third port scrambling sequence of third port based on the first collection of port sequences and the third port scrambling sequence of the third port based on the second collection of port sequences based on information carried on the DCI channel, the first port option selection, or the second port option selection; and transmitting or receiving a DMRS based on the first port option selection, the second port option selection, and the third port selection option.

In still another aspect, a method of operating an user equipment (UE) includes: configuring an UE to transmit or receive on a first port of a plurality of demodulation reference signals (DMRS) ports associated with a first code division multiplexing identification (CDM ID), on a second port of the plurality of DMRS ports associated with a second CDM ID, and on a third port of the plurality of DMRS ports associated with a third CDM ID; selecting a first collection of port sequences and a second collection of port sequences from a plurality of sequence options, each of the first collection of port sequences and the second collection of port sequences comprising a first CDM ID sequence identification (ID), a second CDM ID sequence ID, and a third CDM ID sequence ID, wherein each of the first CDM ID sequence identification (ID), the second CDM ID sequence ID, and the third CDM ID sequence ID is one of a first value, a second value, or a third value; configuring a first port scrambling sequence of the first port, a second port scrambling sequence of the second port, and a third port scrambling sequence of the third port for each of the first collection of port sequences and the second collection of port sequences; performing a dynamic selection of a first port option selection for the first port between the first port scrambling sequence of first port based on the first collection of port sequences and the first port scrambling sequence of the first port based on the second collection of port sequences based on information carried on a downlink control information (DCI) channel; performing a dynamic selection of a second port option selection for the second port between the second port scrambling sequence of second port based on the first collection of port sequences and the second port scrambling sequence of the second port based on the second collection of port sequences based on information carried on the DCI channel; performing a dynamic selection of a third port option selection for the third port between the third port scrambling sequence of third port based on the first collection of port sequences and the third port scrambling sequence of the third port based on the second collection of port sequences based on information carried on the DCI channel; and transmitting or receiving a DMRS based on the first port option selection, the second port option selection, and the third port selection option.

In still another aspect, a method of operating an user equipment (UE) includes: configuring an UE with a first scrambling sequence of a first code division multiplexing identification (CDM ID), a second scrambling sequence of a second CDM ID, and a third scrambling sequence a third CDM ID, each of the first scrambling sequence, the second scrambling sequence, and the third scrambling sequence derived from a scrambling selection value selected from a combination of a DMRS port index of a DMRS port table and information in a DCI channel; and wherein the DMRS port table comprises a plurality of scrambling selection values and associated port combinations, each of the plurality of scrambling selection values is one of a first value, a second value, or a third value, and a first reserved DCI bit is used to select one of the plurality of scrambling selection values and associated port combinations.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 6 illustrates exemplary sequence mapping to resource elements in accordance with some examples of the disclosure;

FIG. 7A-B illustrates exemplary sequence repetition resulting in high PAPR for configuration types 1 and 2 in accordance with some examples of the disclosure;

FIG. 8 illustrates exemplary configuration scheme for selecting different scrambling selection values for CDM IDs in accordance with some examples of the disclosure;

FIG. 10 illustrates an exemplary DMRS port table in accordance with some examples of the disclosure;

Figure 1:
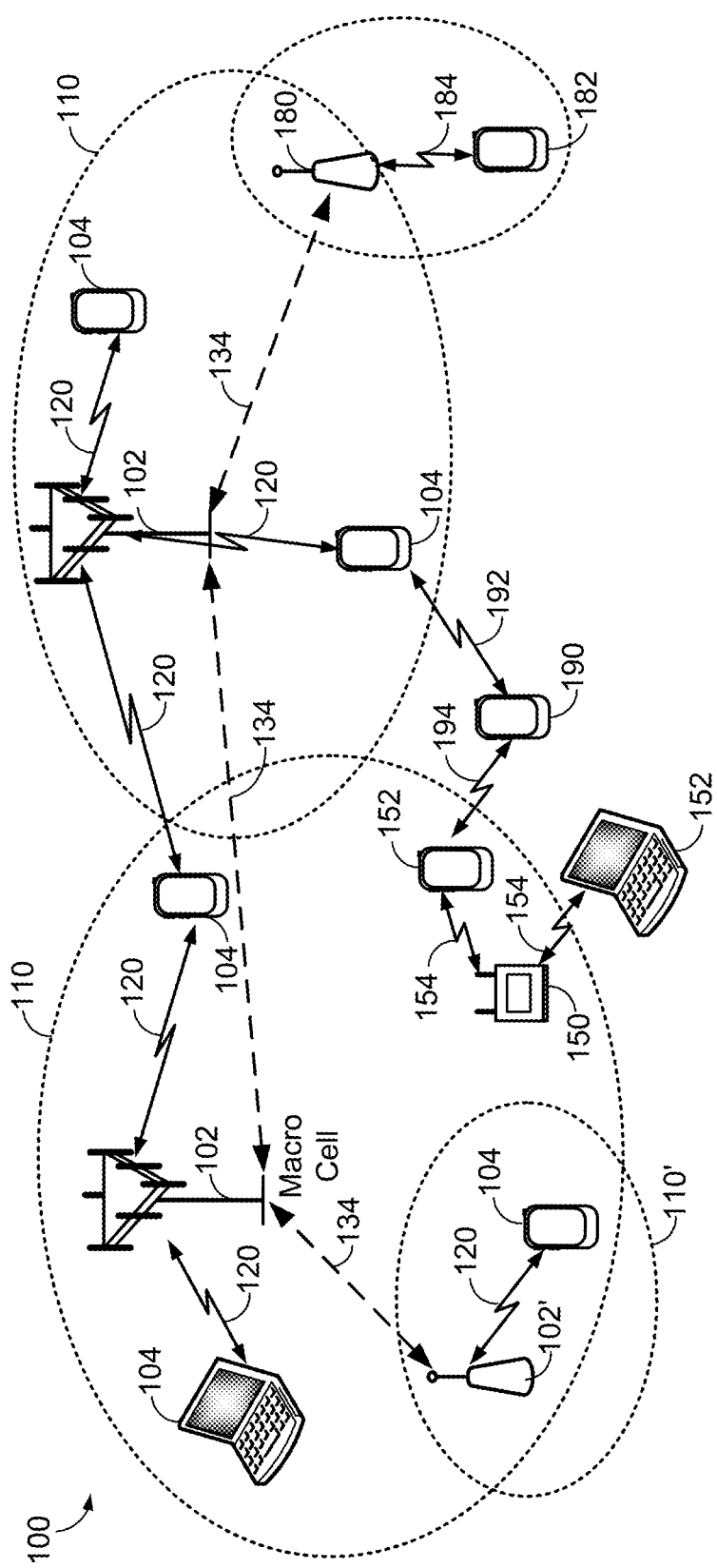
FIG. 1 illustrates an exemplary wireless communications system in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
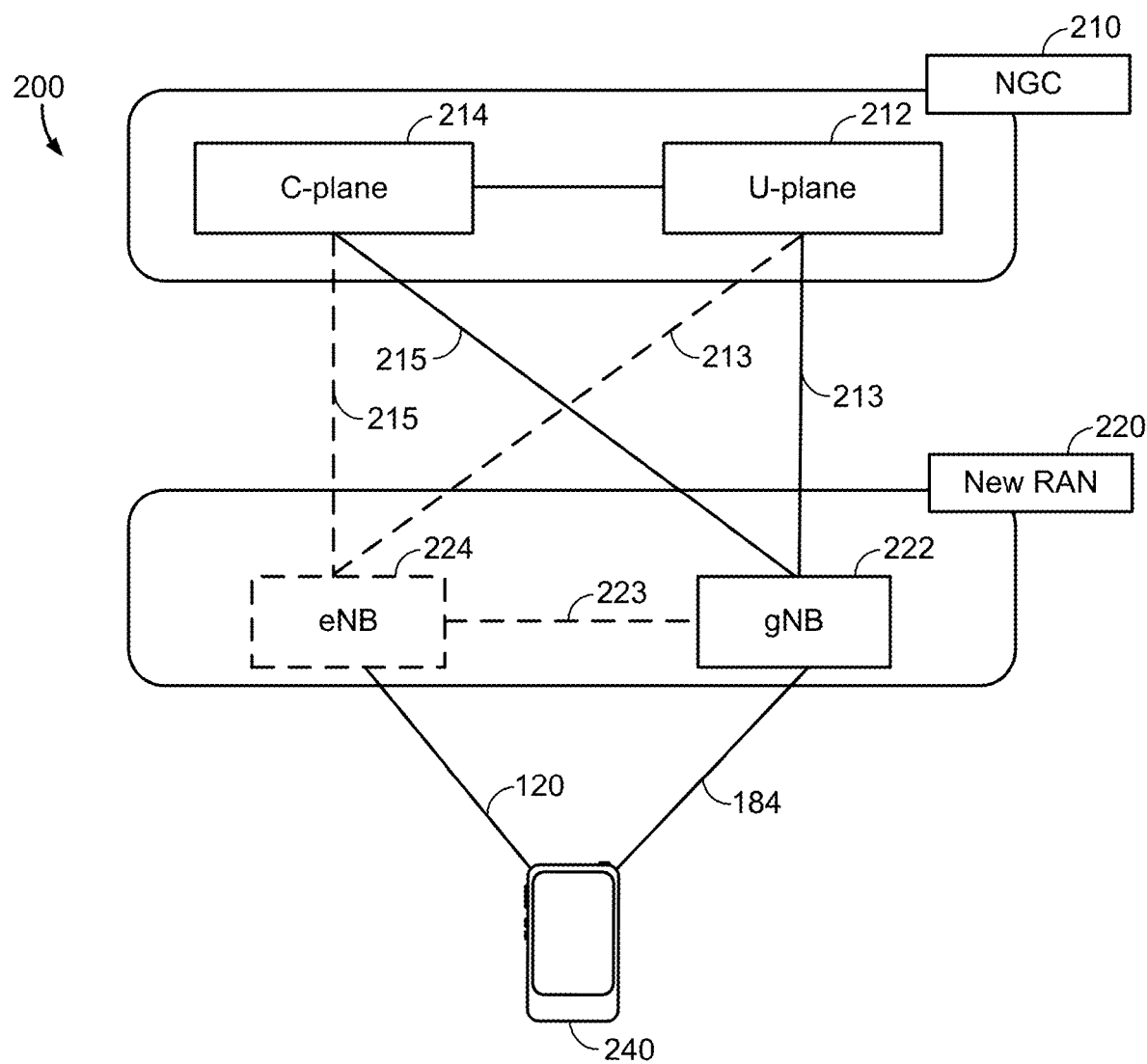
FIGS. 2A and 2B illustrate example wireless network structures in accordance with some examples of the disclosure.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.).

Figure 2B:
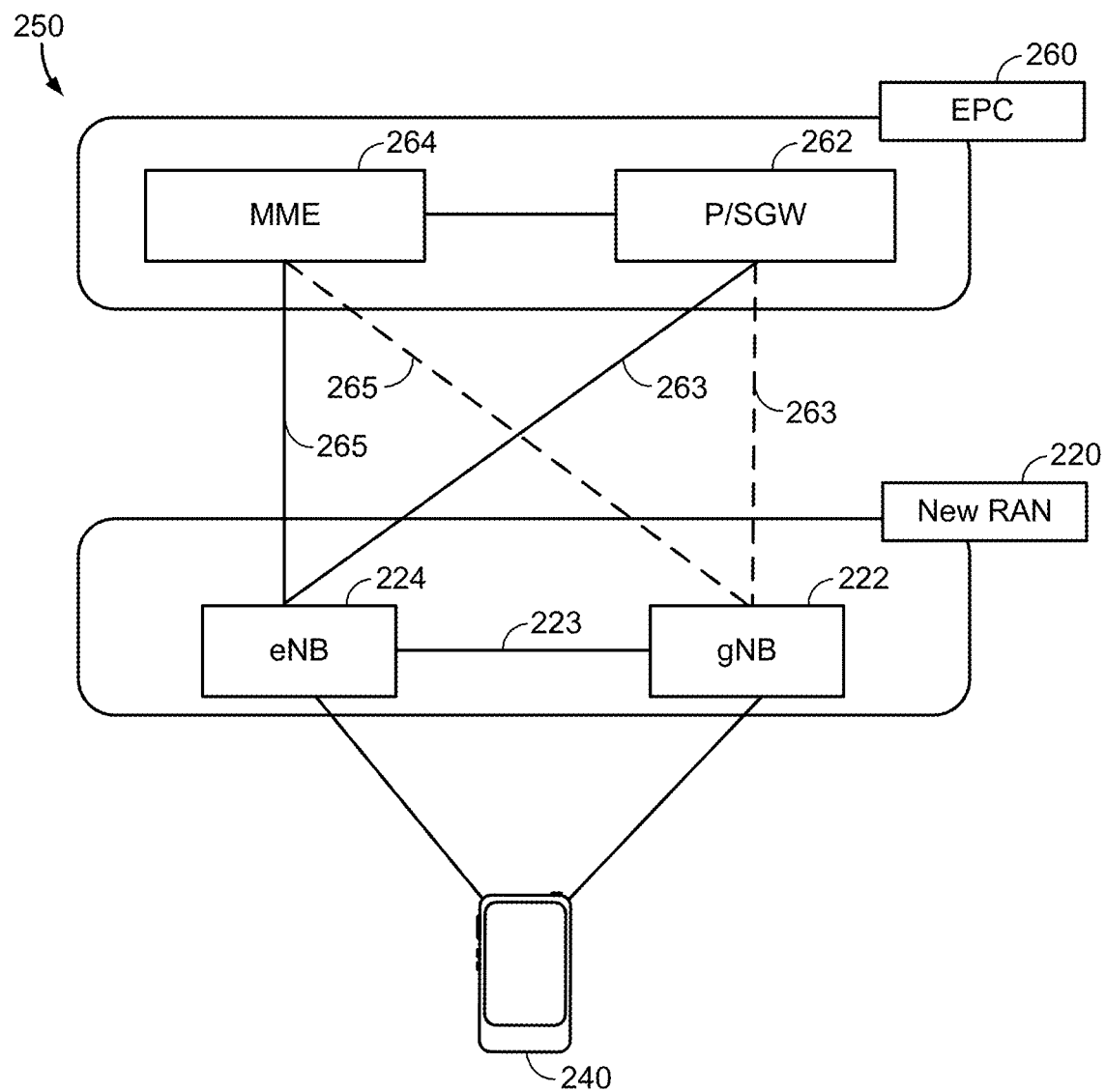

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.).

Figure 3:
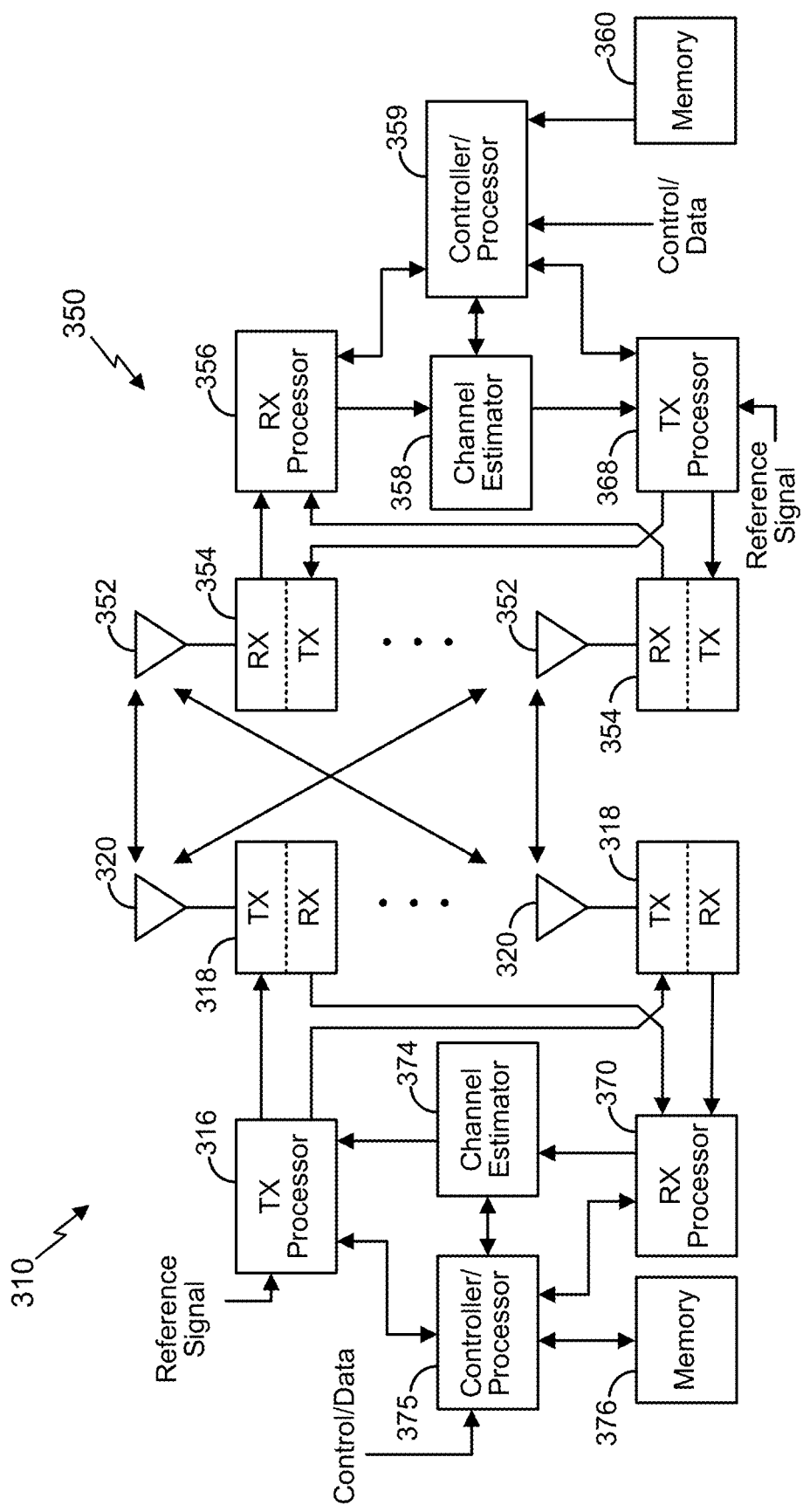
FIG. 3 illustrates an exemplary base station and an exemplary user equipment (UE) in an access network in accordance with some examples of the disclosure.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. It should be understood that antennas 320 may be multi-port antennas, such as the four and eight port antennas described herein. Each transmitter 318TX may modulate an RF carrier with a respective spatial stream for transmission.

At the UE 350, each receiver 354RX receives a signal through its respective antenna 352. It should be understood that antenna 352 may be a multi-port antenna, such as the four and eight port antennas described herein. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
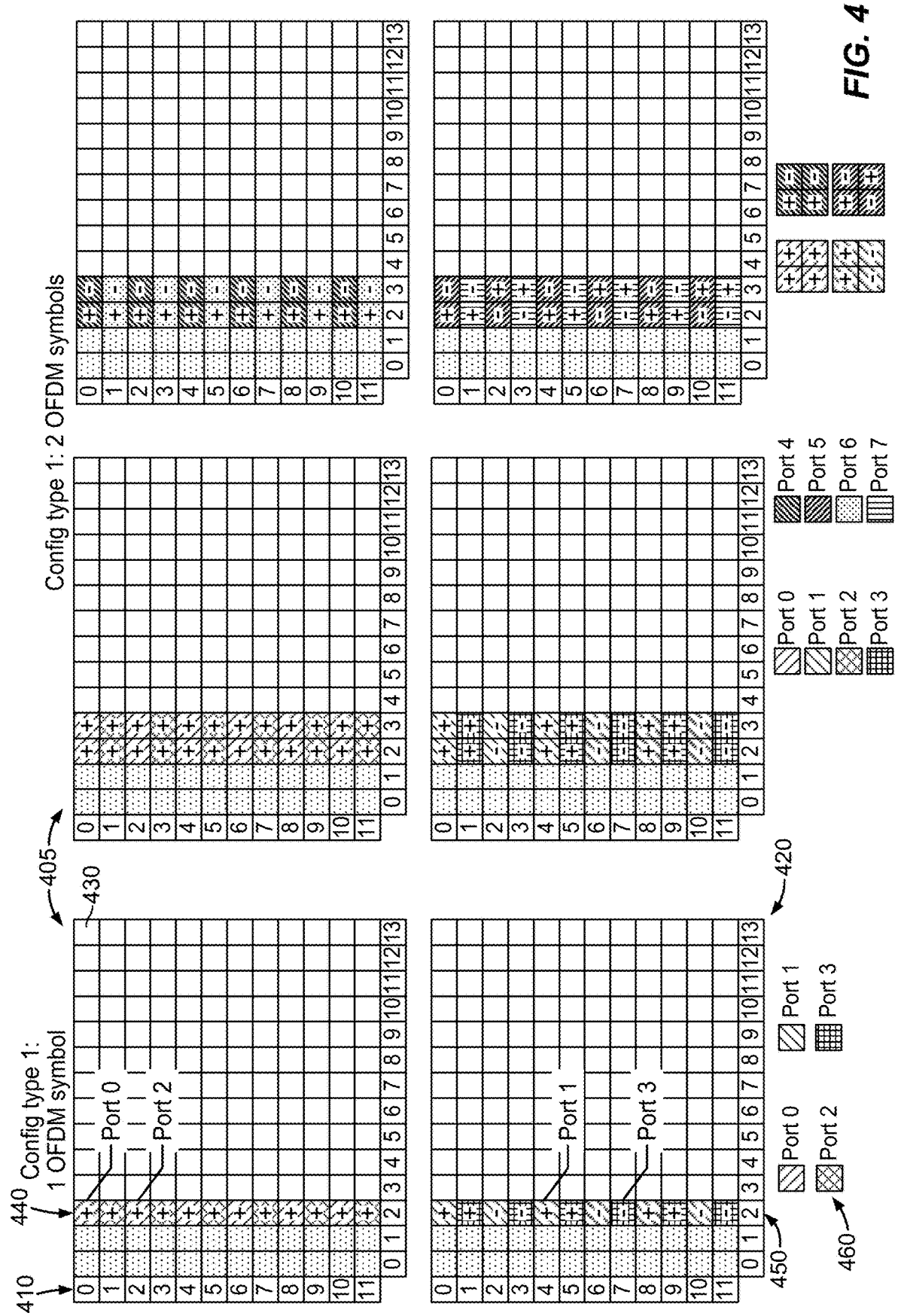
FIG. 4 illustrates exemplary configuration type 1 resource blocks for 1 OFDM symbol and 2 OFDM symbols in accordance with some examples of the disclosure.

FIG. 4 illustrates exemplary configuration type 1 resource blocks for 1 OFDM symbol and 2 OFDM symbols in accordance with some examples of the disclosure. FIG. 4 illustrates exemplary OFDM time-frequency grids 405 for LTE. Generally speaking, the time-frequency grid 405 is divided into one millisecond subframes. Six time-frequency grids 405 are shown in FIG. 4, two for single OFDM symbols and four for double OFDM symbols. Each subframe includes a number of OFDM symbols. For a normal cyclic prefix (CP) link, suitable for use in situations where multipath dispersion is not expected to be extremely severe, a subframe comprises fourteen OFDM symbols. A subframe comprises twelve OFDM symbols if an extended cyclic prefix is used (not shown). In the frequency domain, the physical resources are divided into adjacent subcarriers 410 (twelve subcarriers 0-11 are shown) with a spacing of 15 kHz. The number of subcarriers varies according to the allocated system bandwidth. The smallest element of the time-frequency grid 405 is a resource element 430. A resource element 430 comprises one OFDM symbol on one subcarrier.

For purposes of scheduling transmission on the PDSCH, the downlink time-frequency resources are allocated in units called resource blocks (RBs) 420 (fourteen resource blocks or time slots 0-13 are shown). Each resource block 420 spans twelve subcarriers (which may be adjacent or distributed across the frequency spectrum). Certain resource elements within each subframe may be reserved for the transmission of DMRSs. The resource elements for the DMRSs may be distributed in the frequency domain. The resource elements for the DMRSs may be divided into two or three code division multiplexing (CDM) groups referred to herein as CDM group 1, CDM group 2, and CDM group 3.

As shown in FIG. 4, a first configuration type 1 resource block 440 includes a one symbol DMRS with every other subcarrier 410 assigned to an antenna port 460 (port 0 and port 2) and a second configuration type 1 resource block 450 includes a one symbol DMRS with every other subcarrier 430 assigned to an antenna port 460 for a two com design (port 1 and port 3). As can be seen using the same symbol (+) for each port 460 in resource block 440 and a cycled symbol (+ then −) for each port 460 in resource block 450 enables orthogonalization in the code domain such that a receiver can remove the patterns to receive data on both ports.

Figure 5:
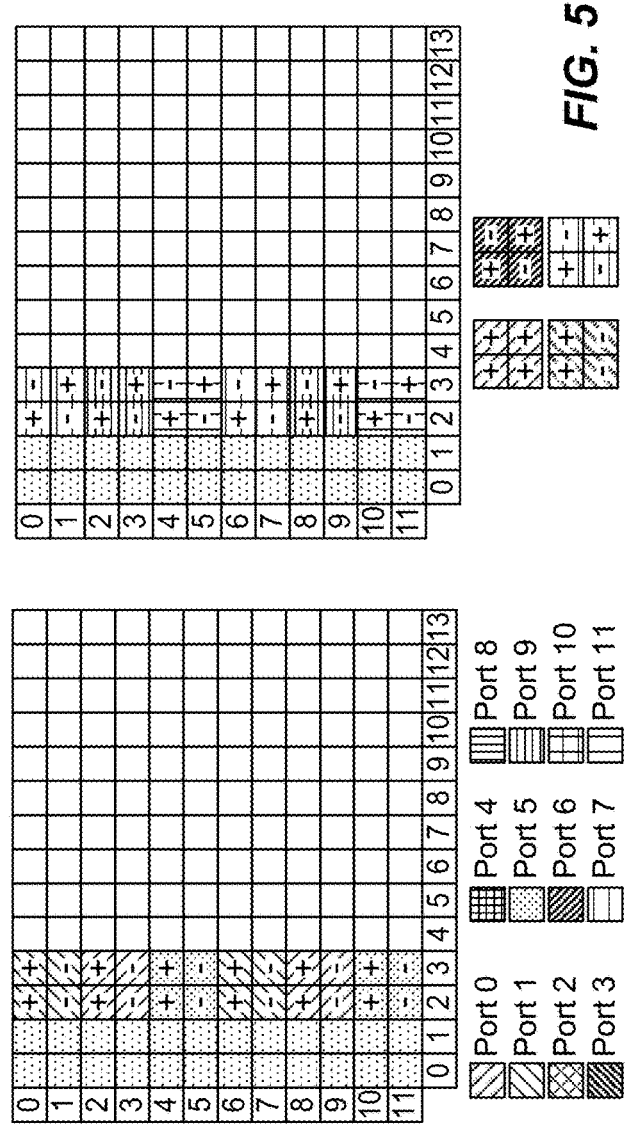
FIG. 5 illustrates exemplary configuration type 2 resource blocks for 1 OFDM symbol and 2 OFDM symbols in accordance with some examples of the disclosure.

FIG. 5 illustrates exemplary configuration type 2 resource blocks for 1 OFDM symbol and 2 OFDM symbols in accordance with some examples of the disclosure. As shown in FIG. 5, a first configuration type 2 resource block 540 includes a one symbol DMRS with two adjacent subcarriers 510 assigned to an antenna port 560 (port 0, port 2, and port 4) and a second configuration type 2 resource block 550 includes a one symbol DMRS with two adjacent subcarriers 530 assigned to an antenna port 560 for a three com design (port 1, port 3, and port 5). As can be seen using the same symbol (+) for each port 560 in resource block 540 and a cycled symbol (+ then −) for each port 560 in resource block 550 enables frequency domain OCC by multiplexing two ports in the code domain such that a receiver can remove the patterns to receive data on both ports.

FIG. 6 illustrates exemplary sequence mapping to resource elements in accordance with some examples of the disclosure. The 5G standard defines a sequence:

$$r(m) = \frac{1}{\sqrt{2}}(1 - 2 \cdot c(2m)) + j\frac{1}{\sqrt{2}}(1 - 2 \cdot c(2m + 1)) \quad \text{EQUATION 2}$$

With the sequence generation initialized with cinit from equation 1 above.

As shown in FIG. 6, a configuration type 2 sequence r(m) may be mapped to resource elements for each CDM group for 2 port CDM groups for antenna ports 0-3. For port 0, a sequence r(m) is used for every other subcarrier 620 (tone) (e.g., resource block 540). For port 1, the same sequence r(m) is used for every other subcarrier 620 with each alternative sequence a plus (+) or minus (−) (e.g., resource block 550). For port 2, a sequence r(m) is used for every other subcarrier 620 (tone) (e.g., resource block 540). For port 2, the same sequence r(m) as port 0 is used for every other subcarrier 620 but offset one subcarrier 620 from the port 0 sequence. For port 3, the same sequence r(m) as port 1 is used for every other subcarrier 620 but offset one subcarrier 620 from the port 0 sequence. This provides repetition in the frequency domain with ports 0 and 1 code division multiplexed and ports 3 and 4 code division multiplexed. In one example, a DCI bit may be used as the scrambling selection value ($n_{scid}$) of 1 or 0 to toggle between the two scrambling identifications ($N_{ID}$).

FIG. 7A-B illustrates exemplary sequence repetition resulting in high PAPR for configuration types 1 and 2 in accordance with some examples of the disclosure. As shown in FIG. 7A, a DMRS configuration type 1 state table 710 may be toggled between a first symbol option 720 (scrambling selection value 0) and a second symbol option 730 (scrambling selection value 1) using the DCI bit as the scrambling selection value for a first CDM ID 740 and a second CDM ID 750 as described in FIG. 5. As shown in FIG. 7B, a DMRS configuration type 2 state table 760 may be toggled between a first symbol option 720 (scrambling selection value 0) and a second symbol option 730 (scrambling selection value 1) using the DCI bit as the scrambling selection value for a first CDM ID 740, a second CDM ID 750, and a third CDM ID 790 as described in FIG. 6. Sequence repetition in the first symbol option 720 as well as the second symbol option 730 results in a high PAPR for power amplifiers used in an uplink or downlink with a 2 dB loss shown in the example. Using the DCI to toggle between the first symbol option 720 and the second symbol option 730, for example, may allow a dynamic point selection (DPS) of a transmission point with a quick switch from one option to the other.

Figure 8:
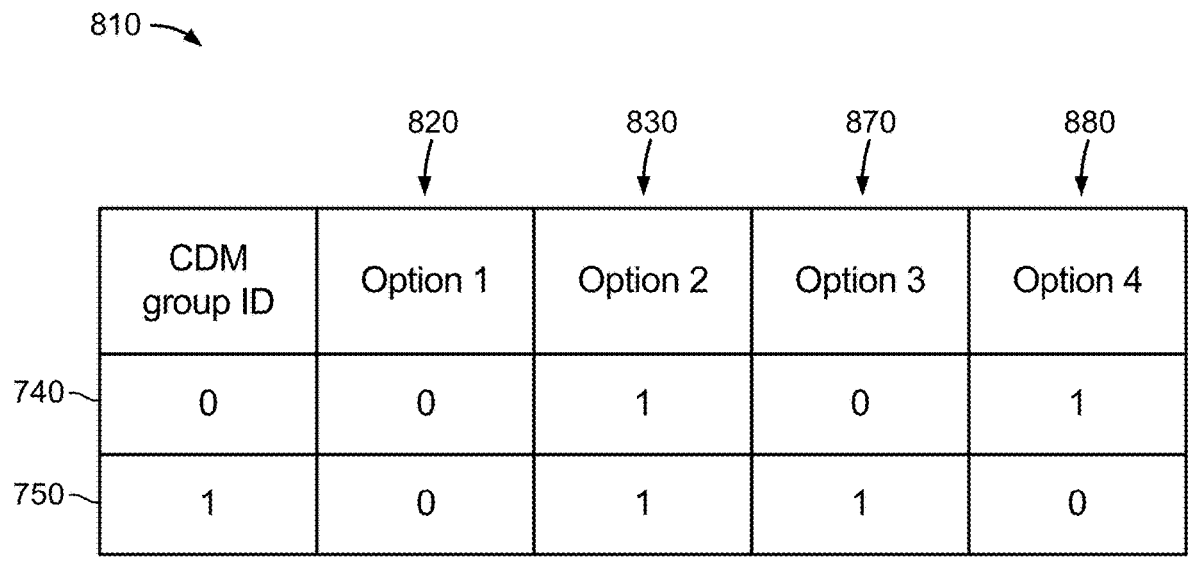

FIG. 8 illustrates exemplary configuration scheme for selecting different scrambling selection values for CDM IDs in accordance with some examples of the disclosure. As shown in FIG. 8, a state table 810 illustrates all possible permutations of a scrambling selection value={0, 1} in a first symbol option 820, a second symbol option 830, a third symbol option 870, and a fourth symbol option 880 for a first CDM ID 840 and a second CDM ID 850. A DCI bit may be used as a scrambling selection value to toggle between any two selected options to avoid sequence repetition (enabling a low PAPR). For example, a UE or base station (BS) may be configure a first CDM ID 840 and a second CDM ID 850 with each of the first CDM ID 840 and the second CDM ID 850 comprising a first symbol option 820, a second symbol option 830, a third symbol option 870, and a fourth symbol option 880 that is one of a first value (0) or a second value (1). The UE or BS may be further configured first selected option and a second selected option for each of the first CDM ID 840 and the second CDM ID 850 with the first selected option is selected from one of the first symbol option 820, the second symbol option 830, the third symbol option 870, or the fourth symbol option 880 and the second selected option is selected from a different one of the first symbol option 820, the second symbol option 830, the third symbol option 870, and the fourth symbol option 880. Then the UE or BS may perform a DPS of a transmission point between the first selected option and the second selected option based on a DCI bit that enables a toggling between options to avoid sequence repetition resulting in a low PAPR.

In Rel-15 DMRS, only the first symbol option 820 and the second symbol option 830 are available while in Rel-16 the third symbol option 870 and the fourth symbol option 880 are available as additional DMRS options. In one example, a radio resource control (RRC) or a medium access control (MAC) control element (CE) of the UE or BS may be used to select the first selected option and the second selected option. If a UE or BS in only release 15 compatible, the first symbol option 820 and the second symbol option may be selected. If a UE or BS in only release 16 compatible, the third symbol option 870 and the fourth symbol option may be selected. If no configuration is given, the UE or BS default to the third symbol option 870 and the fourth symbol options.

In another example using three CDM IDs (see FIG. 5 configuration type 2, backward compatibility with release 15 may be maintained by with only two scrambling selection values={0, 1} using the DCI bit to toggle between {0,1} and {1,0} for the first 2 CDM IDs and the sequence of the third CDM ID may be chosen by applying a specified function on the configured scrambling identifications ($N_{ID}^0$, $N_{ID}^1$) or one of them. For example, the three following equations may be used:

$$c\_init(0) =$$
$$(2^{17}(N_{symb}^{slot}n_{(s,f)}^{\mu} + l + 1)(2N_{ID}^{nSCID} + 1) + 2N_{ID}^{nSCID} + n_{SCID}) \bmod 2^{31}$$

-continued $$c\_init(1) = (2^{17}(S_y^{noot}n_{(s,f)}^\mu + l + 1)(2N_{ID}^{1-nSCID} + 1) + 2N_{ID}^{1-nSCID} + 1 - n_{SCID})\mod 2^{31}$$

$$c\_init(2) = (2^{17}(N_{symb}^{slot}n_{(s,f)}^\mu + l + 1)(2N_{ID}^{nSCID} + 1) + 2N_{ID}^{nSCID} + 2^{17} + n_{SCID})\mod 2^{31}$$

where nSCID=$n_{SCID}$.

From these equation, it may be seen that: For the first 2 CDM IDs, toggle between {0,1} and {1,0} for the $n_{SCID}$ (i.e., toggle between {0,1} and {1,0} for the first 2 CDM IDs). For the $3^{rd}$ CDM ID, use a specified function of the ($N_{ID}^0$, $N_{ID}^1$), as follows:
define CDM ID for the $3^{rd}$ CDM group as $N_{ID}^{(2)}$, and write down the sequence generation formula as a function of this CDM ID value:

$$c\_init(2) = (2^{17}(N_{symb}^{slot}n_{(s,f)}^\mu + l + 1)(2N_{ID}^2 + 1) + 2N_{ID}^2 + 2^{17} + n_{SCID})\mod 2^{31}$$

As may be seen, this results in a specified function of:
In the first portion "$2^{17}$ ($N_{symb}^{slot}$ $n_{(s,f)}^\mu$+l+1)(2$N_{ID}^2$+1)" use $N_{ID}^2$=$N_{ID}^0$ or $N_{ID}^2$=$N_{ID}^1$ based on the DCI;
In the second portion "2$N_{ID}^{nSCID}$+$n_{NSID}$" use 2$N_{ID}^2$=2$N_{ID}^0$+$2^{17}$ or $N_{ID}^2$=$N_{ID}^1$+$2^{17}$ based on the DCI, where nSCID=$n_{SCID}$.

Thus, the sequence of the $3^{rd}$ CDM ID (see the above sequence generation formula) is chosen by applying a specified function on the ($N_{ID}^0$, $N_{ID}^1$).

In another example, the third CDM ID may be using the sequence derived by applying the scrambling selection value=0 and increment the second scrambling identification ($n_{SCID}$=0, and $N_{ID}^2$=$N_{ID}^0$+1). In still another example, for the ports in the third CDM ID, the scrambling selection value may be equal to a specified number (e.g. 2). In this example, the $N_{ID}^2$ would need to be only even numbers, so that the initialization value for the scrambling sequence (cinit) collisions are avoided when unique combinations of the scrambling identification and the scrambling selection value give a unique initialization value for the scrambling sequence. Alternatively, the scrambling identification $N_{ID}^2$ be one of the $N_{ID}^0$ and $N_{ID}^1$. The scrambling identification may be 0 to 65535.

Figure 9:
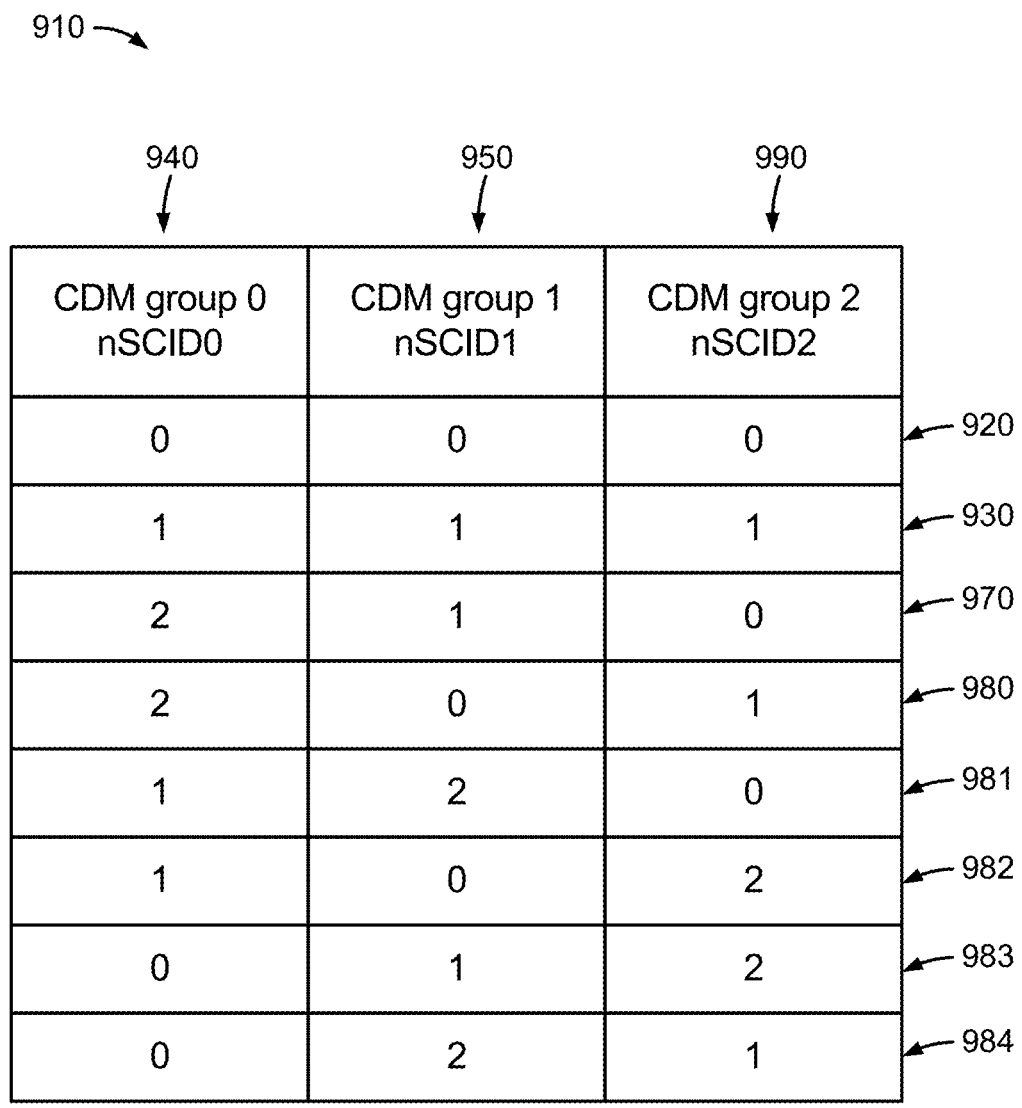
FIG. 9 illustrates an exemplary state table for 3 CDM IDs and 8 symbol options in accordance with some examples of the disclosure.

FIG. 9 illustrates exemplary state table for 3 CDM IDs and 8 symbol options in accordance with some examples of the disclosure. As shown in FIG. 9, a state table 910 illustrates all possible permutations of a scrambling selection value={0, 1, 2} in a first symbol option 920, a second symbol option 930, a third symbol option 970, a fourth symbol option 980, a fifth symbol option 981, a sixth symbol option 982, a seven symbol option 983, and an eighth symbol option 984 for a first CDM ID 940, a second CDM ID 950, and a third CDM ID 990. Each of the first CDM ID 940, the second CDM ID 950, and the third CDM ID 990 may be associated with one of the scrambling selection values. A DCI bit may be used as a scrambling selection value to toggle between any two selected options to avoid sequence repetition (enabling a low PAPR). In this example, the distribution of the scrambling selection value may be configurable. For example, using equation 1 above and allowing the scrambling selection value for each CDM ID to be different is allowed to be different, the RRC may be used to configure any 2 combinations scrambling selection value={0, 1, 2} as shown in the FIG. 9. Then DCI bit may be used to choose between the RRC-configured values. Alternatively, a MAC-CE command may be used to down select from the 8 combinations of FIG. 9 to a smaller set in conjunction with DCI bit. If no RRC-configuration is available, the first symbol option 920 and the second symbol option 930 may be used allowing backward compatibility with the Rel-15 approach of only two scrambling selection values {0, 1}.

FIG. 10 illustrates an exemplary DMRS port table in accordance with some examples of the disclosure. As shown in FIG. 10, a DMRS port table 1010 may include a DCI bit value 1020 for different DMRS port combinations 1030 with a number of the bit values 1020 reserved. However, certain DMRS port combinations 1030 associated with repetitive scrambling sequences may cause a high PAPR. Selecting different scrambling selection values will result in different scrambling sequences based on problematic port combinations. For instance, a high-PAPR may result when multiple ports across three CDM IDs (port groups) are configured such as the case of two codewords where many entries in the DMRS port table are "Reserved". In one example, new entries in the DMRS port table 1010 using the reserved bit values may be used in which the scrambling selection values ($n_{SCID}^0$, $n_{SCID}^1$, $n_{SCID}^2$) are picked with different combinations. In this example, for any port combination, any of the eight scrambling selection values {0, 1, 2} ($n_{SCID}^0$, $n_{SCID}^1$, $n_{SCID}^2$) combinations may be dynamically pick using the DMRS port table 1010 and reserved DCI bit values. For instance, DCI bit value 6 may be used to select a scrambling selection value for port 0, port 3, and port 5 to avoid problematic port combinations that result in sequence repetition. Alternative, joint encoding across the DMRS port table and the 1-bit in the DCI such that performing a dynamic point selection (DPS) of a transmission point between a selected one of the plurality of scrambling selection values and a second one of the plurality of scrambling selection values, wherein a second reserved DCI bit is used to select the second one of the plurality of scrambling selection values and associated port combinations.

For the port combinations spanning a second CDM ID and a third CDM ID, the sequence of the $3^{rd}$ CDM group is the same as the $1^{st}$ CDM group (which may be unused in this port combination). For instance when the third scrambling sequence is the same as the first scrambling sequence when the selected port combinations of the first CDM ID and the second CDM ID overlap.

Figure 11:
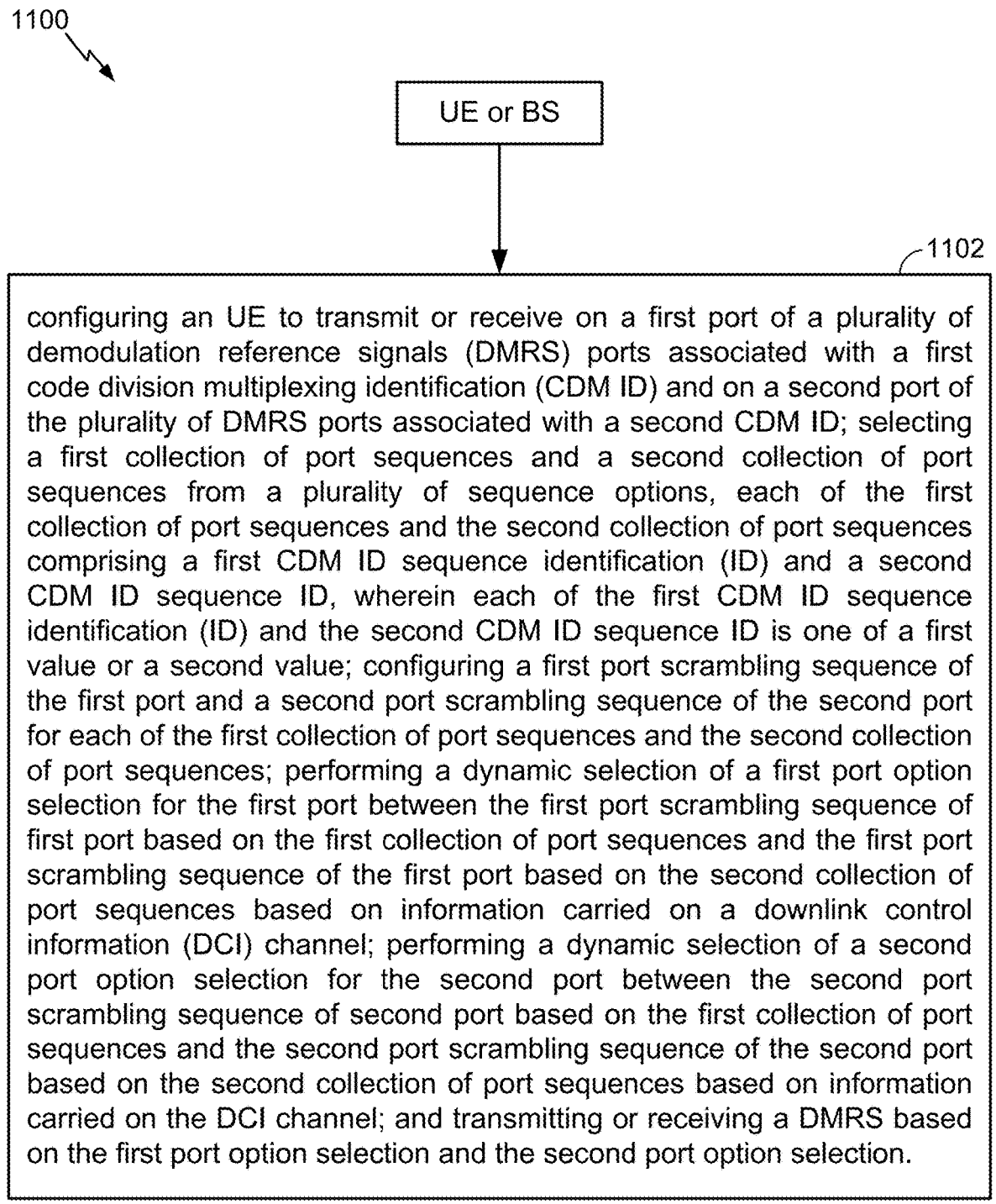
FIG. 11 illustrates a first exemplary process for configuring a UE or BS in accordance with some examples of the disclosure.

FIG. 11 illustrates a first exemplary process for configuring a UE or BS in accordance with some examples of the disclosure. As shown in FIG. 11, a partial process 1100 may be applicable to an UE or a BS and include 1102—configuring an UE to transmit or receive on a first port of a plurality of demodulation reference signals (DMRS) ports associated with a first code division multiplexing identification (CDM ID) and on a second port of the plurality of DMRS ports associated with a second CDM ID; selecting a first collection of port sequences and a second collection of port sequences from a plurality of sequence options, each of the first collection of port sequences and the second collection of port sequences comprising a first CDM ID sequence identification (ID) and a second CDM ID sequence ID, wherein each of the first CDM ID sequence identification (ID) and the second CDM ID sequence ID is one of a first value or a second value; configuring a first port scrambling sequence of the first port and a second port scrambling sequence of the second port for each of the first collection of port sequences and the second collection of port sequences; performing a dynamic selection of a first port option selection for the first port between the first port scrambling sequence of first port based on the first collection of port sequences and the first port scrambling sequence of the first port based on the second collection of port sequences based on information carried on a downlink control information (DCI) channel; performing a dynamic selection of a second port option selection for the second port between the second port scrambling sequence of second port based on the first collection of port sequences and the second port scrambling sequence of the second port based on the second collection of port sequences based on information carried on the DCI channel; and transmitting or receiving a DMRS based on the first port option selection and the second port option selection.

Figure 12:
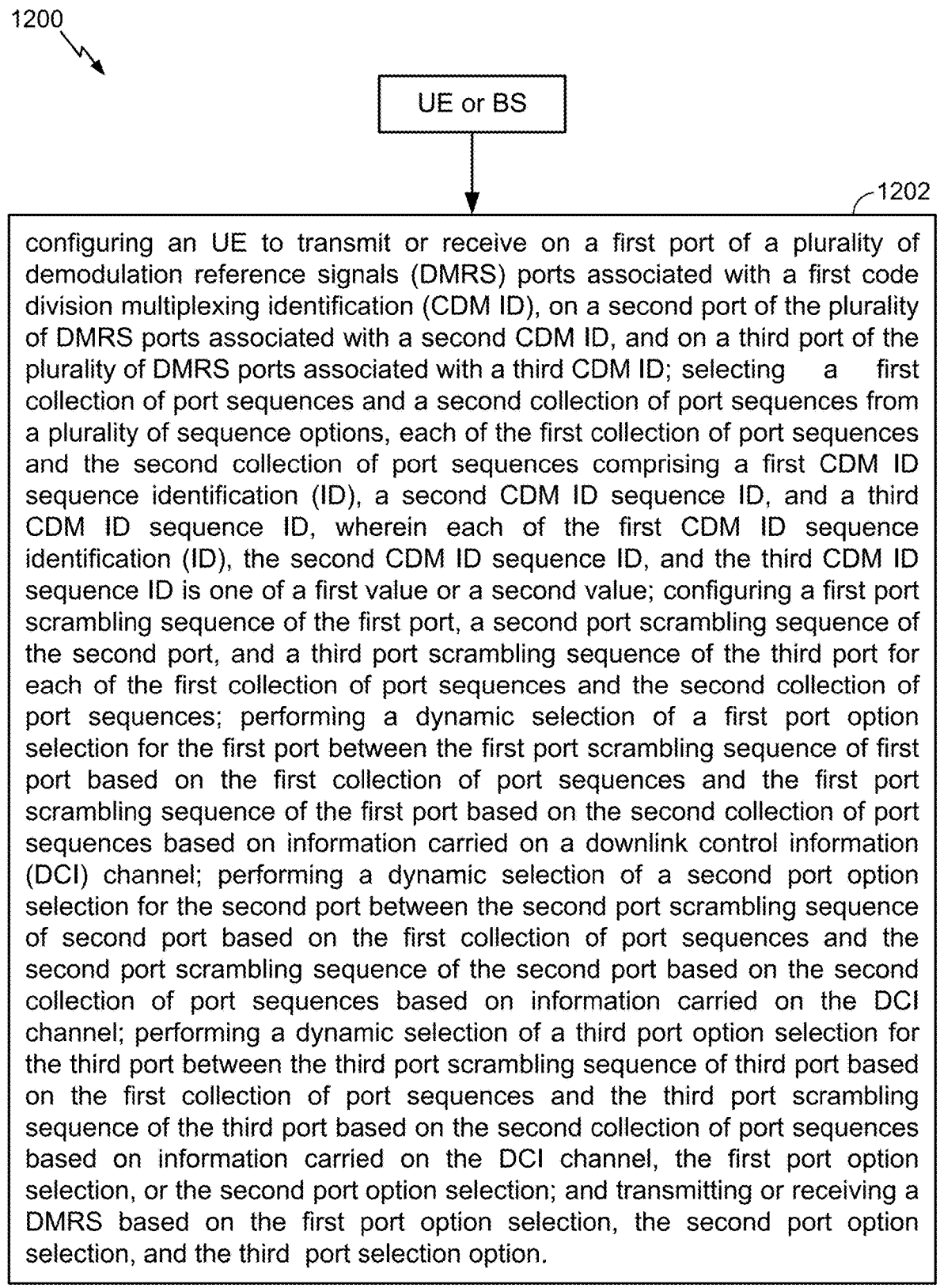
FIG. 12 illustrates a second exemplary process for configuring a UE or BS in accordance with some examples of the disclosure.

FIG. 12 illustrates a second exemplary process for configuring a UE or BS in accordance with some examples of the disclosure. As shown in FIG. 12, a partial process 1200 may be applicable to an UE or a BS and include 1202—configuring an UE to transmit or receive on a first port of a plurality of demodulation reference signals (DMRS) ports associated with a first code division multiplexing identification (CDM ID), on a second port of the plurality of DMRS ports associated with a second CDM ID, and on a third port of the plurality of DMRS ports associated with a third CDM ID; selecting a first collection of port sequences and a second collection of port sequences from a plurality of sequence options, each of the first collection of port sequences and the second collection of port sequences comprising a first CDM ID sequence identification (ID), a second CDM ID sequence ID, and a third CDM ID sequence ID, wherein each of the first CDM ID sequence identification (ID), the second CDM ID sequence ID, and the third CDM ID sequence ID is one of a first value or a second value; configuring a first port scrambling sequence of the first port, a second port scrambling sequence of the second port, and a third port scrambling sequence of the third port for each of the first collection of port sequences and the second collection of port sequences; performing a dynamic selection of a first port option selection for the first port between the first port scrambling sequence of first port based on the first collection of port sequences and the first port scrambling sequence of the first port based on the second collection of port sequences based on information carried on a downlink control information (DCI) channel; performing a dynamic selection of a second port option selection for the second port between the second port scrambling sequence of second port based on the first collection of port sequences and the second port scrambling sequence of the second port based on the second collection of port sequences based on information carried on the DCI channel; performing a dynamic selection of a third port option selection for the third port between the third port scrambling sequence of third port based on the first collection of port sequences and the third port scrambling sequence of the third port based on the second collection of port sequences based on information carried on the DCI channel, the first port option selection, or the second port option selection; and transmitting or receiving a DMRS based on the first port option selection, the second port option selection, and the third port selection option.

Figure 13:
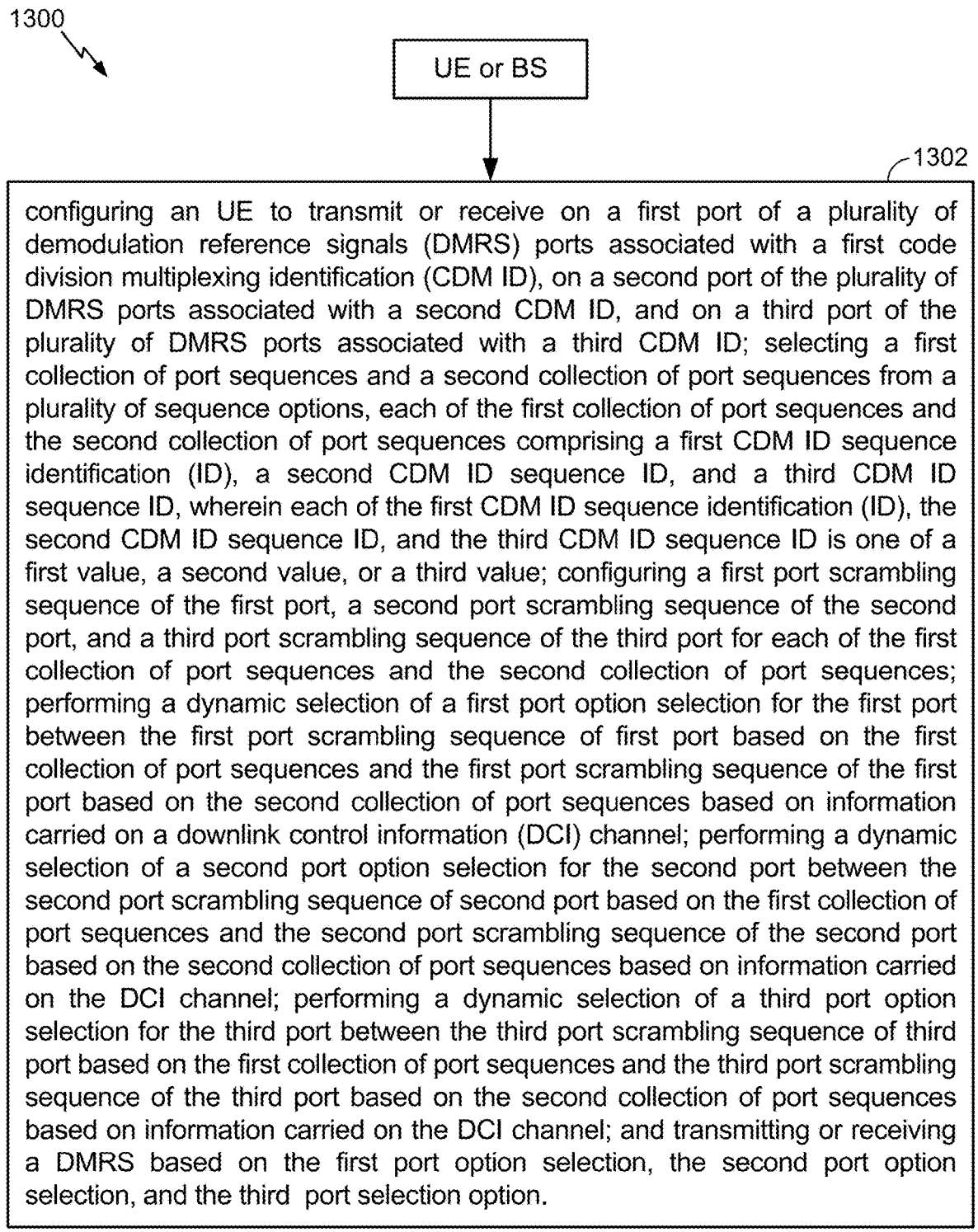
FIG. 13 illustrates a third exemplary process for configuring a UE or BS in accordance with some examples of the disclosure.

FIG. 13 illustrates a third exemplary process for configuring a UE or BS in accordance with some examples of the disclosure. As shown in FIG. 13, a partial process 1300 may be applicable to an UE or a BS and include 1302—configuring an UE to transmit or receive on a first port of a plurality of demodulation reference signals (DMRS) ports associated with a first code division multiplexing identification (CDM ID), on a second port of the plurality of DMRS ports associated with a second CDM ID, and on a third port of the plurality of DMRS ports associated with a third CDM ID; selecting a first collection of port sequences and a second collection of port sequences from a plurality of sequence options, each of the first collection of port sequences and the second collection of port sequences comprising a first CDM ID sequence identification (ID), a second CDM ID sequence ID, and a third CDM ID sequence ID, wherein each of the first CDM ID sequence identification (ID), the second CDM ID sequence ID, and the third CDM ID sequence ID is one of a first value, a second value, or a third value; configuring a first port scrambling sequence of the first port, a second port scrambling sequence of the second port, and a third port scrambling sequence of the third port for each of the first collection of port sequences and the second collection of port sequences; performing a dynamic selection of a first port option selection for the first port between the first port scrambling sequence of first port based on the first collection of port sequences and the first port scrambling sequence of the first port based on the second collection of port sequences based on information carried on a downlink control information (DCI) channel; performing a dynamic selection of a second port option selection for the second port between the second port scrambling sequence of second port based on the first collection of port sequences and the second port scrambling sequence of the second port based on the second collection of port sequences based on information carried on the DCI channel; performing a dynamic selection of a third port option selection for the third port between the third port scrambling sequence of third port based on the first collection of port sequences and the third port scrambling sequence of the third port based on the second collection of port sequences based on information carried on the DCI channel; and transmitting or receiving a DMRS based on the first port option selection, the second port option selection, and the third port selection option.

Figure 14:
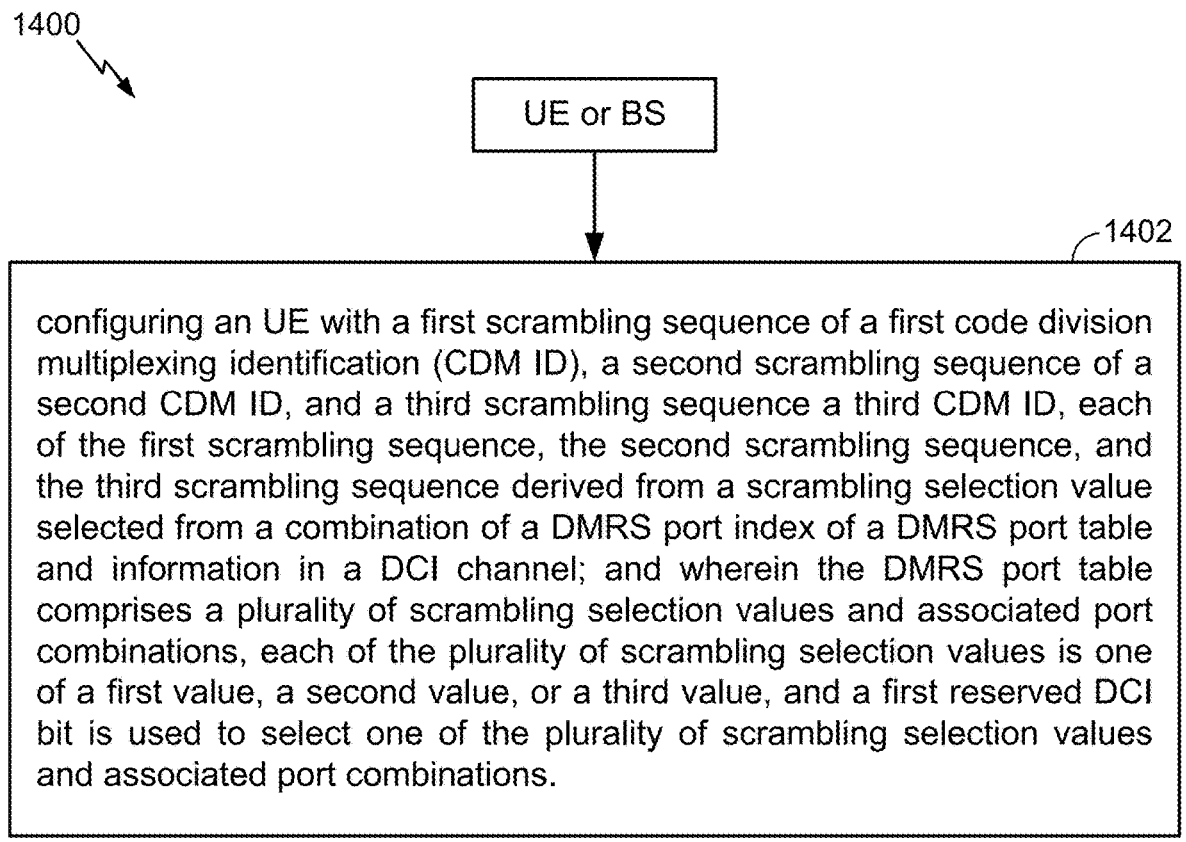
FIG. 14 illustrates a fourth exemplary process for configuring a UE or BS in accordance with some examples of the disclosure.

FIG. 14 illustrates a fourth exemplary process for configuring a UE or BS in accordance with some examples of the disclosure. As shown in FIG. 14, a partial process 1400 may be applicable to an UE or a BS and include 1402—configuring an UE with a first scrambling sequence of a first code division multiplexing identification (CDM ID), a second scrambling sequence of a second CDM ID, and a third scrambling sequence a third CDM ID, each of the first scrambling sequence, the second scrambling sequence, and the third scrambling sequence derived from a scrambling selection value selected from a combination of a DMRS port index of a DMRS port table and information in a DCI channel; and wherein the DMRS port table comprises a plurality of scrambling selection values and associated port combinations, each of the plurality of scrambling selection values is one of a first value, a second value, or a third value, and a first reserved DCI bit is used to select one of the plurality of scrambling selection values and associated port combinations.

It should be understood that various electronic devices that may be integrated with any of the aforementioned devices in accordance with some examples of the disclosure. For example, a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle. The listed devices are merely exemplary. Other electronic devices may also feature the integrated device that store or retrieve data or computer instructions, or any combination thereof.

It will be appreciated that various aspects disclosed herein can be described as functional equivalents to the structures, materials and/or devices described and/or recognized by those skilled in the art. For example, in one aspect, an apparatus may comprise a means for storing information (e.g., memory 376 and memory 360 of FIG. 3); a means for processing information (e.g., processor 375 and processor 359 of FIG. 3) coupled to the means for storing information, and a means for transmitting and receiving RF signals (e.g., antenna 320 and antenna 352) coupled to the means for processing information; wherein the means for processing information is configured to: configuring the apparatus with a first selected option and a second selected option for each of the first CDM ID and the second CDM ID, the first selected option is selected from the first symbol option, the second symbol option, the third symbol option, and the fourth symbol option and the second selected option is selected from a different one of the first symbol option, the second symbol option, the third symbol option, and the fourth symbol option; performing a dynamic point selection (DPS) of a transmission point between the first selected option and the second selected option based on a downlink control information (DCI) bit. It will be appreciated that the aforementioned aspects are merely provided as examples and the various aspects claimed are not limited to the specific references and/or illustrations cited as examples.

One or more of the components, processes, features, and/or functions illustrated in FIGS. 1-14 may be rearranged and/or combined into a single component, process, feature or function or incorporated in several components, processes, or functions. Additional elements, components, processes, and/or functions may also be added without departing from the disclosure. It should also be noted that FIGS. 1-14 and its corresponding description in the present disclosure is not limited to dies and/or ICs. In some implementations, FIGS. 1-14 and its corresponding description may be used to manufacture, create, provide, and/or produce integrated devices.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE), IEEE 802.11 (WiFi), and IEEE 802.15.4 (Zigbee/Thread) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations). Additionally, these sequence of actions described herein can be considered to be incorporated entirely within any form of computer-readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that-although a dependent claim can refer in the claims to a specific combination with one or a plurality of claims-other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure and the attached Appendix, incorporated herein as part of this disclosure, show illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    receiving a configuration of a parameter related to a demodulation reference signal (DMRS) sequence generation, wherein the parameter comprises a first selection value or a second selection value, and wherein the first selection value and the second selection value are selected from a set of {0, 1};
    generating a first sequence for a DMRS for mapping to at least one resource element associated with a first code division multiplexing (CDM) group, generating a second sequence for the DMRS for mapping to at least one resource element associated with a second CDM group, generating a third sequence for the DMRS for mapping to at least one resource element associated with a third CDM group, or a combination thereof, wherein the first sequence is generated based on a first scrambling value associated with the first selection value of the parameter, the second sequence is generated based on a second scrambling value associated with the second selection value of the parameter, and the third sequence is generated based on applying a specified function on the first selection value, the second selection value, or a combination thereof; and
    communicating the first sequence on the at least one resource element associated with the first CDM group, the second sequence on the at least one resource element associated with the second CDM group, the third sequence on the at least one resource element associated with the third CDM group, or a combination thereof.

2. The method of claim 1, wherein the configuration is received via downlink control information (DCI).

3. A user equipment (UE), comprising:
    a memory;
    at least one transceiver; and
    at least one processor communicatively coupled to the memory and the at least one transceiver, the memory storing instructions for the at least one processor to cause the UE to:
        receive, via the at least one transceiver, a configuration of a parameter related to a demodulation reference signal (DMRS) sequence generation, wherein the parameter comprises a first selection value or a second selection value, and wherein the first selection value and the second selection value are selected from a set of {0, 1};
        generate a first sequence for a DMRS for mapping to at least one resource element associated with a first code division multiplexing (CDM) group, generating a second sequence for the DMRS for mapping to at least one resource element associated with a second CDM group, generating a third sequence for the DMRS for mapping to at least one resource element associated with a third CDM group, or a combination thereof, wherein the first sequence is generated based on a first scrambling value associated with the first selection value of the parameter, the second sequence is generated based on a second scrambling value associated with the second selection value of the parameter, and the third sequence is generated based on applying a specified function on the first selection value, the second selection value, or a combination thereof; and
        communicate, via the at least one transceiver, the first sequence on the at least one resource element associated with the first CDM group, the second sequence on the at least one resource element associated with the second CDM group, the third sequence on the at least one resource element associated with the third CDM group, or a combination thereof.

4. The UE of claim 3, wherein the configuration is received via downlink control information (DCI).

5. A user equipment (UE), comprising:
    means for receiving a configuration of a parameter related to a demodulation reference signal (DMRS) sequence generation, wherein the parameter comprises a first selection value or a second selection value, and wherein the first selection value and the second selection value are selected from a set of {0, 1};
    means for generating a first sequence for a DMRS for mapping to at least one resource element associated with a first code division multiplexing (CDM) group, generating a second sequence for the DMRS for mapping to at least one resource element associated with a second CDM group, generating a third sequence for the DMRS for mapping to at least one resource element associated with a third CDM group, or a combination thereof, wherein the first sequence is generated based on a first scrambling value associated with the first selection value of the parameter, the second sequence is generated based on a second scrambling value associated with the second selection value of the parameter, and the third sequence is generated based on applying a specified function on the first selection value, the second selection value, or a combination thereof; and
    means for communicating the first sequence on the at least one resource element associated with the first CDM group, the second sequence on the at least one resource element associated with the second CDM group, the third sequence on the at least one resource element associated with the third CDM group, or a combination thereof.

6. The UE of claim 5, wherein the configuration is received via downlink control information (DCI).

7. A non-transitory computer-readable medium storing instructions for at least one processor to cause a user equipment (UE) to:
    receive a configuration of a parameter related to a demodulation reference signal (DMRS) sequence generation, wherein the parameter comprises a first selection value or a second selection value, and wherein the first selection value and the second selection value are selected from a set of {0, 1};

generate a first sequence for a DMRS for mapping to at least one resource element associated with a first code division multiplexing (CDM) group, generating a second sequence for the DMRS for mapping to at least one resource element associated with a second CDM group, generating a third sequence for the DMRS for mapping to at least one resource element associated with a third CDM group, or a combination thereof, wherein the first sequence is generated based on a first scrambling value associated with the first selection value of the parameter, the second sequence is generated based on a second scrambling value associated with the second selection value of the parameter, and the third sequence is generated based on applying a specified function on the first selection value, the second selection value, or a combination thereof; and communicate the first sequence on the at least one resource element associated with the first CDM group, the second sequence on the at least one resource element associated with the second CDM group, the third sequence on the at least one resource element associated with the third CDM group, or a combination thereof.

8. The non-transitory computer-readable medium of claim 7, wherein the configuration is received via downlink control information (DCI).

* * * * *